United States Patent
Chockalingam et al.

(10) Patent No.: US 11,157,367 B1
(45) Date of Patent: Oct. 26, 2021

(54) PROMOTIONAL LOGIC DURING DATABASE DIFFERENTIAL BACKUP

(71) Applicant: EMC IP Holding Company LLC, Hopkinton, MA (US)

(72) Inventors: Elango Chockalingam, Bangalore (IN); Amarendra Behera, Bangalore (IN); Krishnendu Bagchi, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 486 days.

(21) Appl. No.: 14/871,529

(22) Filed: Sep. 30, 2015

(51) Int. Cl.
*G06F 16/00* (2019.01)
*G06F 11/14* (2006.01)
*G06F 16/23* (2019.01)

(52) U.S. Cl.
CPC ...... *G06F 11/1451* (2013.01); *G06F 16/2358* (2019.01)

(58) Field of Classification Search
CPC ........... G06F 17/1451; G06F 17/30067; G06F 11/1448; G06F 11/1461
USPC ........................................................ 707/646
See application file for complete search history.

(56) References Cited

U.S. PATENT DOCUMENTS

| | | | | |
|---|---|---|---|---|
| 5,778,395 A * | 7/1998 | Whiting | ............... | G06F 11/1464 |
| 6,397,308 B1 * | 5/2002 | Ofek | ................... | G06F 11/1451 |
| | | | | 707/999.202 |
| 6,651,077 B1 * | 11/2003 | East | .................... | G06F 11/1469 |
| 6,675,177 B1 * | 1/2004 | Webb | | |
| 7,165,154 B2 * | 1/2007 | Coombs et al. | ............... | 711/162 |
| 7,801,859 B1 * | 9/2010 | Desai | ...................... | G06F 16/10 |
| | | | | 707/640 |
| 7,941,619 B1 * | 5/2011 | Rossi | .................. | G06F 11/1458 |
| | | | | 711/162 |
| 8,260,750 B1 * | 9/2012 | Gugick | ............... | G06F 11/1461 |
| | | | | 707/645 |
| 8,341,121 B1 * | 12/2012 | Claudatos | ........... | G06F 11/1451 |
| | | | | 707/640 |
| 8,583,601 B1 * | 11/2013 | Claudatos | ........... | G06F 11/1461 |
| | | | | 707/654 |
| 8,615,495 B1 * | 12/2013 | Payne | ................. | G06F 11/1451 |
| | | | | 707/646 |
| 8,666,944 B2 * | 3/2014 | Beatty | ................. | G06F 11/1451 |
| | | | | 707/679 |
| 8,712,970 B1 * | 4/2014 | Sim-Tang | ............... | G06F 16/20 |
| | | | | 707/672 |
| 8,756,198 B2 * | 6/2014 | Mehrotra | ............ | G06F 16/2272 |
| | | | | 707/640 |
| 9,032,171 B2 * | 5/2015 | Niles | ........................ | G03B 5/00 |
| | | | | 711/162 |

(Continued)

*Primary Examiner* — Jean M Corrielus
(74) *Attorney, Agent, or Firm* — Krishnendu Gupta; Nikhil Patel

(57) ABSTRACT

Techniques to back up data are disclosed. In various embodiments, an indication to perform a differential backup of a database is received. It is verified that a full backup to be referenced by the differential backup is available on backup media. It is determined that no intervening backup was performed subsequent to the full backup that would create a risk of data loss in the event a recovery operation based on the differential backup were performed, including by ignoring any intervening backup that may have been performed but is of a type that would not give rise to such a risk of data loss. The differential backup is performed, without promoting to full backup, based on least in part on said determination.

28 Claims, 4 Drawing Sheets

(56) References Cited

U.S. PATENT DOCUMENTS

| | | | |
|---|---|---|---|
| 9,235,606 B1* | 1/2016 | Mooney | G06F 16/21 |
| 9,740,577 B1* | 8/2017 | Chakraborty | G06F 11/1469 |
| 10,108,652 B2* | 10/2018 | Kumarasamy | G06F 16/168 |
| 10,503,604 B2* | 12/2019 | Anami | G06F 3/0643 |
| 2002/0107877 A1* | 8/2002 | Whiting | G06F 11/1453 |
| 2004/0030852 A1* | 2/2004 | Coombs et al. | 711/162 |
| 2006/0059384 A1* | 3/2006 | Helliker | G06F 11/1464 714/13 |
| 2007/0136541 A1* | 6/2007 | Herz et al. | 711/162 |
| 2010/0218966 A1* | 9/2010 | Liebhard | B25F 5/001 173/170 |
| 2010/0332453 A1* | 12/2010 | Prahlad | G06F 11/1469 707/640 |
| 2010/0332561 A1* | 12/2010 | Prahlad | G06F 11/1451 707/812 |
| 2010/0332990 A1* | 12/2010 | Prahlad | G06F 16/27 715/735 |
| 2011/0218966 A1* | 9/2011 | Barnes | G06F 11/1004 707/645 |
| 2012/0078855 A1* | 3/2012 | Beatty | G06F 11/1451 707/676 |
| 2012/0239624 A1* | 9/2012 | Barnes | G06F 3/0632 707/645 |
| 2013/0006945 A1* | 1/2013 | Prahlad | G06F 11/1464 707/674 |
| 2013/0151472 A1* | 6/2013 | Niles | G03B 5/00 707/646 |
| 2013/0238559 A1* | 9/2013 | Bushman | G06F 3/0617 707/639 |
| 2014/0025640 A1* | 1/2014 | Prahlad | H04L 67/1097 707/654 |
| 2015/0199239 A1* | 7/2015 | Prahlad | G06F 11/1451 707/654 |
| 2015/0242428 A1* | 8/2015 | Niles | G06F 21/56 707/646 |
| 2015/0278034 A1* | 10/2015 | Barnes | G06F 3/067 714/15 |
| 2016/0364156 A1* | 12/2016 | Haustein | G06F 11/1458 |
| 2017/0116088 A1* | 4/2017 | Anami | G06F 3/0643 |
| 2017/0192683 A1* | 7/2017 | Neporada | G06F 11/1458 |
| 2017/0255526 A1* | 9/2017 | Barnes | G06F 3/0619 |
| 2019/0102094 A1* | 4/2019 | Mutha | G06F 11/1453 |

* cited by examiner

PROMOTIONAL LOGIC DURING DATABASE DIFFERENTIAL BACKUP

BACKGROUND OF THE INVENTION

Backup solutions, such as EMC® Networker® backup offerings, may be used to back up data associated with applications and/or services. For example, a SQL or other database may be backed up using such solutions. Typically, a backup API of the application server may be called to cause the application to generate the backup data that is to be indexed and stored by the backup solution on backup media.

For large files and data sets, such as a very large database file, a FULL backup (i.e., a complete copy of all data objects in a data set) may be desired to be performed only during maintenance periods, e.g., when demand to access the production data may be expected to be relatively low, such as on weekends or late at night. At other times, a DIFFERENTIAL backup may be generated. A differential backup typically involves backing up only data that has been changed since a most recently completed backup. A differential backup may comprise data sufficient to reconstruct the data set as of the backup time with which the differential backup is associated, but only if a full backup referenced by the differential backup is available. For example, a full backup of a data set as of 1am and a differential backup of the data set as of 10 am that references the 1am full backup may be required to restore the data set to its state as of the 10 am differential backup.

As noted, to be useable to restore the data set without data loss to a state associated with a differential backup both data backed up during the differential backup and the full backup on which the differential backup depends must be available. In addition, since the application API typically is used to generate the backup data, it may be necessary to ensure that no intervening backup that might have changed the last backed up state of the application data from the perspective of the application has been performed. In modern network environments, backup solutions from more than one backup vendor may be in use in a network or other enterprise environment. In some cases, to ensure continuity a check may be required and performed to determine whether any backup of application data has been performed by another vendor's backup solution which might result in data loss if a differential backup is performed that depends on a full backup that was taken prior to such an intervening backup having been performed.

BRIEF DESCRIPTION OF THE DRAWINGS

Various embodiments of the invention are disclosed in the following detailed description and the accompanying drawings.

DETAILED DESCRIPTION

Figure 1:
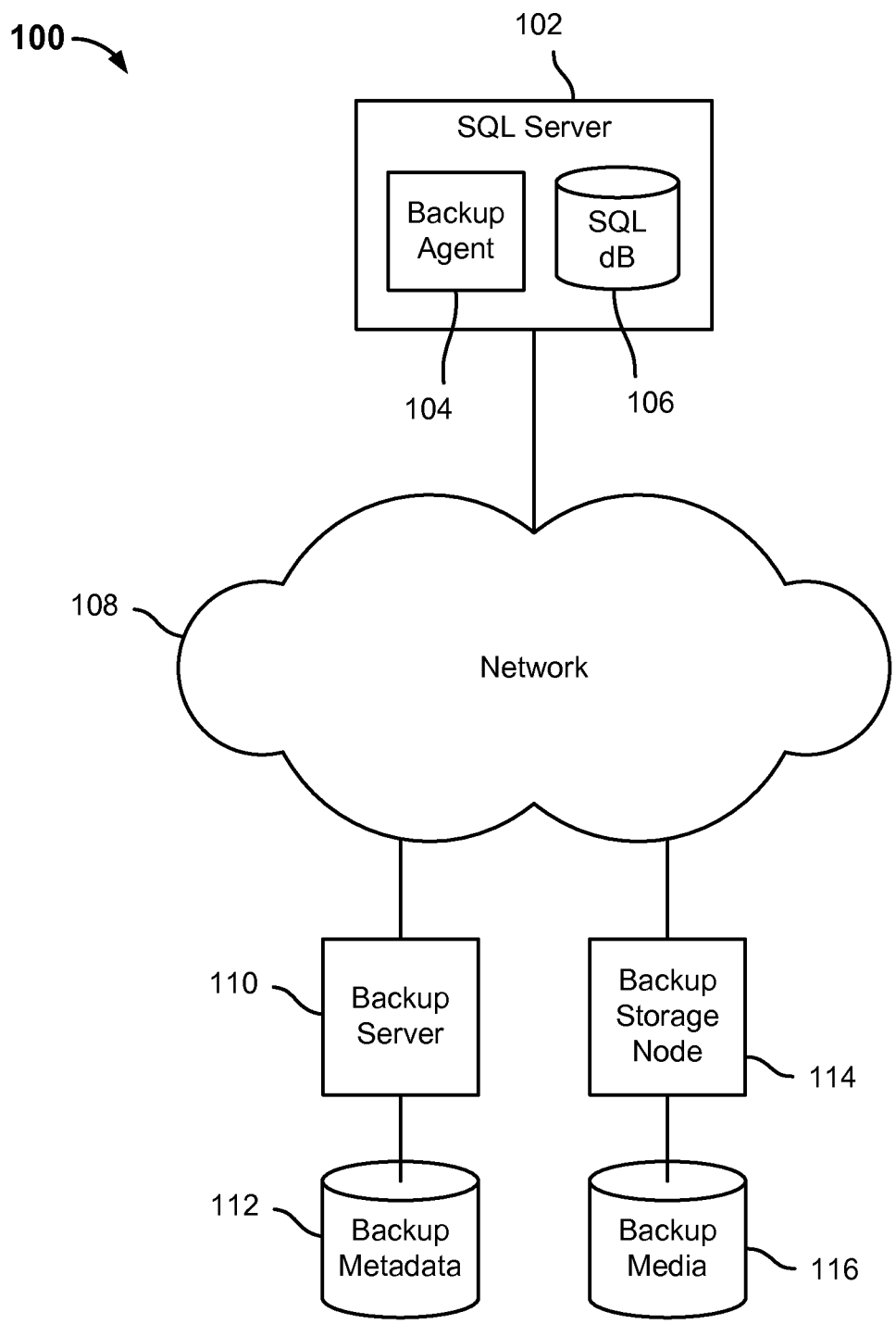
FIG. 1 is a block diagram illustrating an embodiment of a backup system and environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to efficiently backup data are disclosed. In various embodiments, a check may be performed at the time a differential backup is to be performed to ensure no intervening backup that might result in data loss has been performed, e.g., by a third party backup vendor, since a last full backup with respect to which the differential backup is to be performed. In various embodiments, to avoid unnecessary promotion of a differential backup to full backup techniques are disclosed to determine based on backup event type whether an intervening backup, if determined to be present, requires promotion of a differential backup to full backup.

In various embodiments, if an intervening backup (e.g., performed by another backup vendor's backup solution) is found to have been performed subsequent to a full backup with respect to which a differential backup is scheduled or otherwise indicated to be taken, the type of backup is checked to determine whether it is necessary to promote the differential backup to full backup. For example, in the case of a Microsoft® SQL server, if an intervening backup is determined to have been a "transaction log" or "TLOG" backup, the differential backup would not promoted to full backup.

FIG. 1 is a block diagram illustrating an embodiment of a backup system and environment. In the example shown, an enterprise network environment 100 includes a SQL server 102 on which a backup agent or other backup client software 104 is installed. Backup agent 104 is configured in various embodiments to backup SQL database 106. Backup agent 104 communicates via network 108 with backup server 110, which uses backup metadata 112 to manage backups of data on associated backup clients, such as SQL server 102, and to keep track of the backed up data, e.g., in one or more index(es) comprising backup metadata 112. Backup agent 104 and backup server 110 may cooperate to cause data comprising or otherwise associated with SQL database 106, or other application data stored on other backup clients, to be backed up across network 108 to a backup storage node 114. Backup storage node 114 stores backup data on backup media 116, e.g., one or more hard disk drives, removable media such as tape media, etc.

In various embodiments, backup agent 104 may be configured to determine, in the event of a differential backup, whether a risk of data loss is presented if a differential backup is performed. For example, in various embodiments, backup agent 104 may be configured to determine whether a last full backup to be referenced by the differential backup is in fact the last full backup to have been performed of the protected data set, e.g., SQL database 106 in the example shown in FIG. 1. In some embodiments, a backup API of the SQL server 102 may be called to determine a last full backup and metadata associated therewith, such as the start and end times of the backup. The backup agent 104 may use the metadata to verify that the last full backup was performed by backup agent 104 in cooperation with backup server 110. In various embodiments, backup agent 104 may further verify that backup data comprising the last full back in fact remains available, e.g., on backup media 116.

In various embodiments, a risk of data loss may be present if a differential backup is performed even if the full backup it references remains available. For example, if another vendor has performed certain types of backup operation, by invoking a backup or related API of SQL server 102 for example, insufficient data may be obtained and backed up in a subsequent differential backup by a vendor whose backup solution performed the last full backup. For this reason, in some prior approaches, detection of any intervening backup performed by another vendor's solution between the time of the full back referenced by a differential backup and the differential backup typically would result in the differential backup being promoted to full backup. However, certain types of backup or related operation that a third party backup vendor's solution may cause a backup client, such as SQL server 102, to perform between the time of a last full back and a subsequent differential backup by the same vendor would not present a risk of data loss.

Examples of an intervening backup operation that would not present such a risk of data loss include, without limitation, a transaction log or TLOG backup of SQL database 106. A transaction log backup, for example, would not result in change block tracking data structures being reset, for example, and therefore no changes would be lost if a differential backup were performed subsequent to such a transaction log backup.

In various embodiments, backup agent 104 and/or backup server 110 is/are configured to query SQL server 102 in such a way that transaction log backups by a third party vendor, and/or other backup operations that do not give rise to a risk of data loss, either are not detected and/or are filtered out of a set of backups identified by the SQL server 102 as having been performed. In various embodiments, if there is no intervening backup OR if the only intervening backup(s) is/are of a type that does not present a risk of data loss in the event a differential backup is performed, such as a transaction log backup of SQL server 102, the intervening backup (if any) is ignored and the differential backup is performed (i.e., the differential backup is not promoted to a full backup).

Figure 2A:
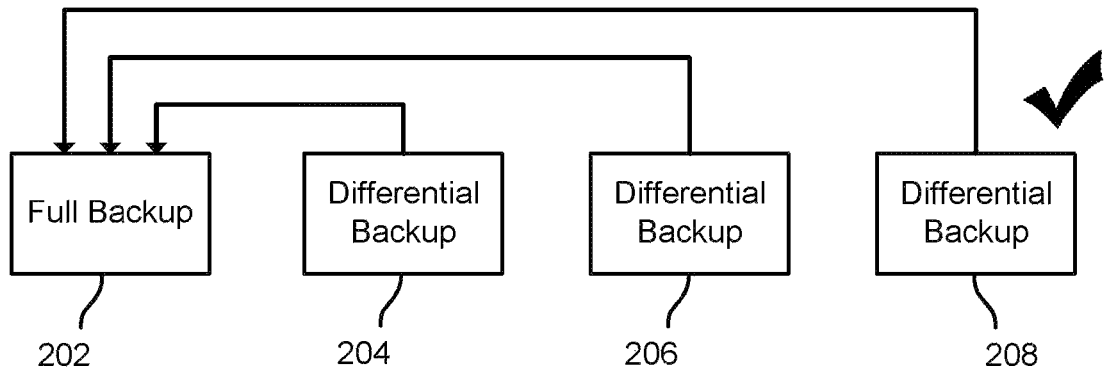
FIG. 2A is a block diagram illustrating an example of a sequence of backups in an embodiment of a backup system.

FIG. 2A is a block diagram illustrating an example of a sequence of backups in an embodiment of a backup system. In the example shown, a full backup 202 was performed followed by an uninterrupted succession of differential backups 204 and 206 by the same vendor. A subsequent differential backup 208 would in this example be performed, without promoting to full backup, as indicated by the check mark.

Figure 2B:
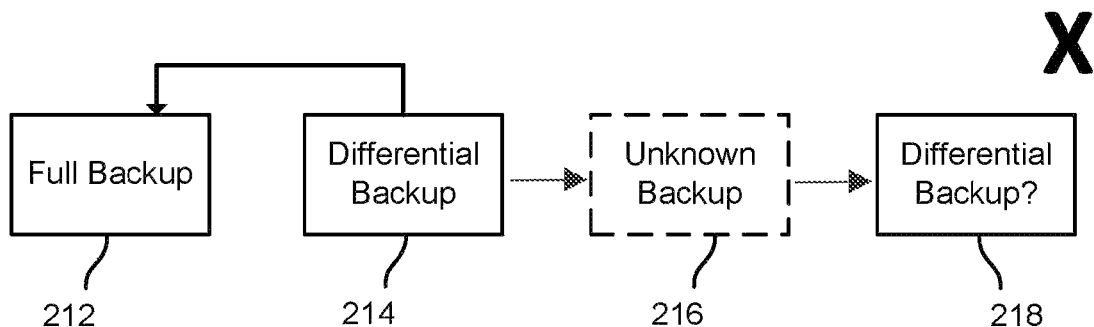
FIG. 2B is a block diagram illustrating an example of a sequence of backups in an embodiment of a backup system.

FIG. 2B is a block diagram illustrating an example of a sequence of backups in an embodiment of a backup system. In this example, a full backup 212 was performed, followed by a differential backup 214 by the same vendor. Subsequently, a backup of unknown type was performed by another vendor. A subsequent planned differential backup 218 by the same vendor whose solution performed full backup 212 and differential backup 214 typically would, upon detecting that unknown intervening backup 216 was performed by another vendor's solution, be promoted to full backup to protect against the risk of data loss, as indicated in FIG. 2B by the large "X" near the box representing planned differential backup 218.

Figure 2C:
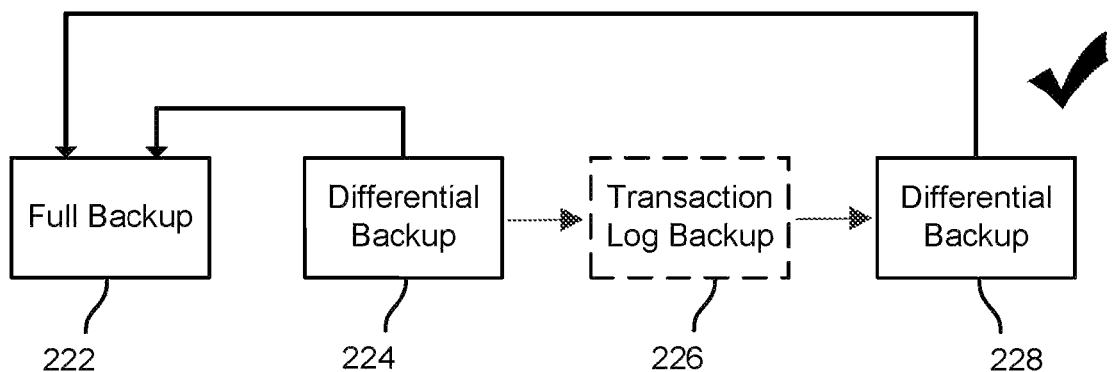
FIG. 2C is a block diagram illustrating example of a sequence of backups in an embodiment of a backup system.

FIG. 2C is a block diagram illustrating example of a sequence of backups in an embodiment of a backup system. In the example shown, a full backup 222 was performed, followed by a subsequent differential backup 224 by the same vendor. An intervening transaction log backup 226 was performed subsequent to full backup 222 (and differential backup 224) but prior to planned differential backup 228 by the same vendor that performed the full backup 222 and differential backup 224. In this example, however, techniques disclosed herein were used to determine that the intervening backup 226 was of a type that did not present a risk of data loss. As a result, the planned differential backup 228 would not be promoted to full backup. Instead, a differential backup would be performed as planned.

Figure 3:
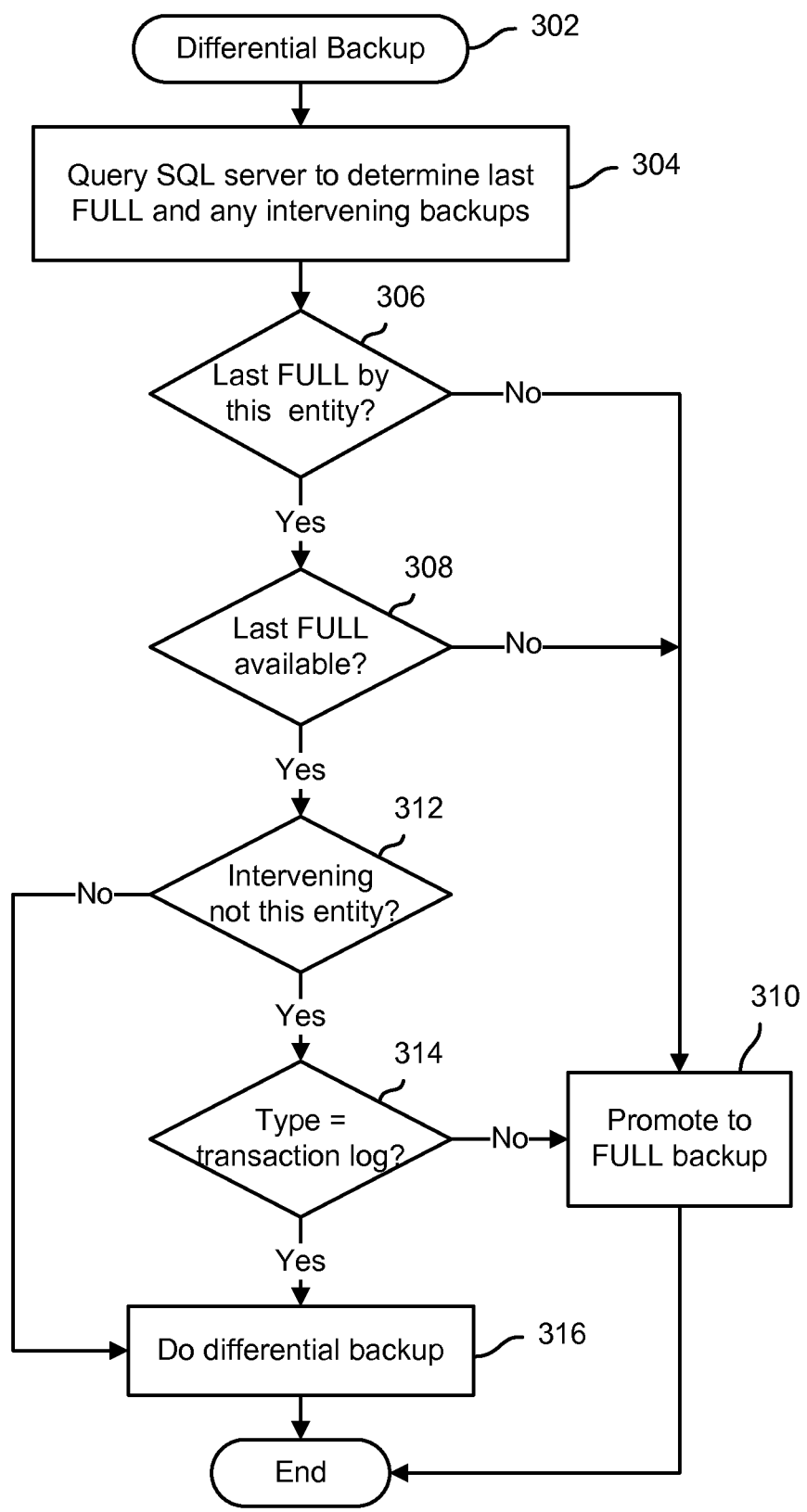
FIG. 3 is a flow chart illustrating an embodiment of a process to perform a differential backup.

FIG. 3 is a flow chart illustrating an embodiment of a process to perform a differential backup. In various embodiments, the process of FIG. 3 may be performed by a backup agent or other backup client side software, such as backup agent 104 of FIG. 1, and/or be a backup server, such as backup server 110 of FIG. 1. In the example shown, an indication to perform a differential backup is received (302). The SQL server is queried, e.g., via a backup or related API, to determine the last full backup and any intervening backups (304). It is determined whether the last full backup was performed by the same backup vendor as the contemplated differential backup (306). If not, the backup is promoted to full backup (310) and the process ends. If the last full backup was by the same vendor (306), it is determined whether the full backup remains available on backup media (308). If not, the backup is promoted to full backup (310) and the process ends. If the last full backup is determined to remain available on backup media (308), it is determined whether any intervening backup was performed by another vendor since the last full backup (312). If no such backup was performed (312), the differential backup is performed as planned (316) and the process ends. If an intervening backup by another vendor is determined to have been performed (312), it is determined whether the backup was a transaction log backup (314). If the intervening backup was other than a transaction log backup (314), the backup is promoted to full backup and the process ends. If, however, the intervening backup is determined to be a transaction log backup (314), the differential backup is performed as planned (316) and the process ends.

Figure 4:
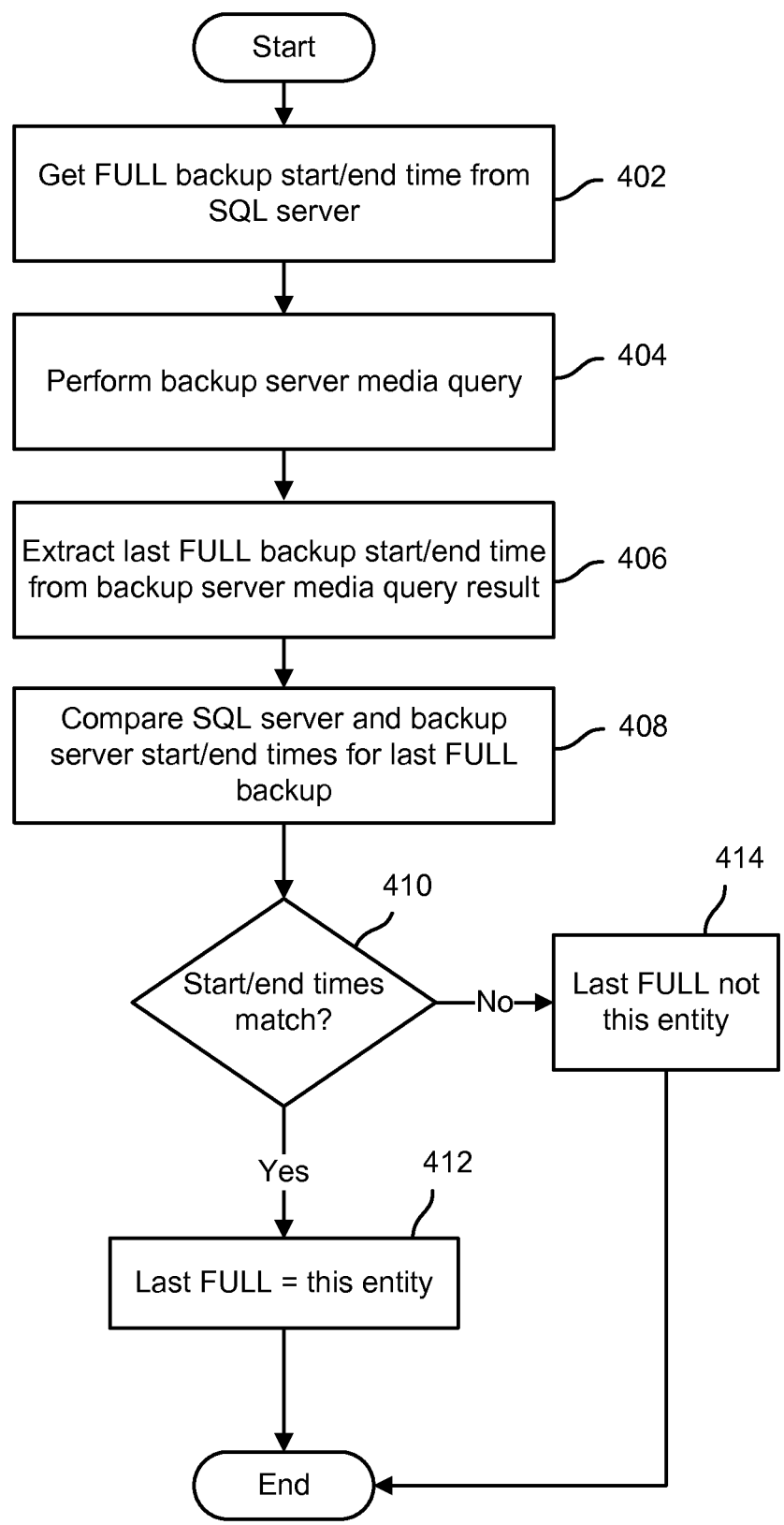
FIG. 4 is a flow chart illustrating an embodiment of a process to determine whether a last full backup was performed by a same vendor as a current backup.

FIG. 4 is a flow chart illustrating an embodiment of a process to determine whether a last full backup was performed by a same vendor as a current backup. In various embodiments, the process of FIG. 4 may be performed by a backup agent or other backup client side software, such as backup agent 104 of FIG. 1, and/or be a backup server, such as backup server 110 of FIG. 1. In some embodiments, one or both of steps 304 and 306 of FIG. 3 may include the process of FIG. 4. In the example shown, the backup start and end times of the last full backup are obtained from the SQL server, e.g., by querying a backup or related API (402). A backup server media query is performed to determine the corresponding last full backup start/end times as stored by the backup server and/or storage node (404). The last full backup start/end times are extracted from the response received to the backup media query (406). The last full backup start/end times obtain from the SQL server and via the backup media query, respectively, are compared to determine whether they relate to the same backup (408). If the start/end times match (410), it is concluded that the last full backup was performed by the same backup vendor/entity (412). If the start/end times do not match (410), it is concluded that the last full backup was not performed by the same backup vendor/entity.

Using techniques disclosed herein, unnecessarily promoting a differential backup to full backup may be prevented, thereby avoiding the consumption of resources and potential down time of the production system to perform a full backup at a time when a differential backup would be sufficient.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of backing up data, comprising:
   receiving, by one or more processors, an indication to perform a differential backup of a database;
   determining, by one or more processors, whether a full backup to be referenced by the differential backup is available on backup media;
   in response to determining that the full backup is available, determining, by one or more processors, whether an intervening backup was performed subsequent to the full backup;
   in response to determining that an intervening backup was performed, determining, by a backup agent executed by one or more processors, whether performing the differential backup creates a risk of data loss with respect to the intervening backup in the event a recovery operation based on the differential backup were performed, wherein:
      the determining whether the performing the differential backup creates the risk of loss is based at least in part on a determination of a type of backup corresponding to the intervening backup, wherein the determining whether the performing the differential backup creates the risk of loss is further based at least in part on a determination that backup data comprised in the full backup remains available; and
   in response to determining that the performing the differential backup is unable to create the risk of data loss, performing, by one or more processors, the differential backup, without promoting to full backup.

2. The method of claim 1, further comprising promoting a backup to be performed from the differential backup to full backup based at least in part on a determination that performing the differential backup creates a risk of data loss with respect to the intervening backup.

3. The method of claim 1, further comprising verifying that a last full backup was performed by a same vendor as the differential backup.

4. The method of claim 3, wherein the verifying that the last full backup was performed by a same vendor as the differential backup comprises using metadata associated with the full backup to determine a backup solution used in connection with backing up the last full backup, and the metadata is obtained by calling a backup application programming interface (API) of a server that manages backup data.

5. The method of claim 1, wherein determining whether the full backup to be referenced by the differential backup is available on backup media includes querying a backup API of the database server to determine metadata associated with a last full backup.

6. The method of claim 5, further comprising performing a backup media query to determine a last full backup according to backup metadata maintained by a backup server.

7. The method of claim 6, wherein determining whether the full backup to be referenced by the differential backup is available on backup media includes comparing a backup start time and a backup end time as stored by the database server with a corresponding backup start time and backup end time as indicated by the backup server.

8. The method of claim 1, wherein the determining whether performing the differential backup creates a risk of data loss with respect to the intervening backup in the event a recovery operation comprises ignoring the intervening backup in response to a determination that the intervening backup is of a type that is unrelated to the risk of data loss.

9. The method of claim 8, wherein ignoring the intervening backup in response to the determination that the intervening backup is of a type that is unrelated to the risk of data loss includes ignoring a transaction log backup.

10. The method of claim 1, wherein:
    the determining whether performing the differential backup creates the risk of data loss is performed for each intervening backup that was performed subsequent to the full backup, and
    the differential backup is performed in response to determining that each of the intervening backups are unrelated to the risk of data loss.

11. The method of claim 1, wherein the determining whether performing the differential backup creates a risk of data loss with respect to the intervening backup in the event a recovery operation based on the differential backup were performed comprises:
    determining a type of backup to which the intervening backup corresponds, and
    determining, based on the type of backup to which the intervening backup corresponds, whether performing the differential backup creates the risk of data loss with respect to the intervening backup.

12. The method of claim 1, wherein the determining that the differential backup would not create the risk of data loss based at least in part on a determination that the intervening backup is a transaction log backup.

13. The method of claim 1, wherein the determining whether the differential backup creates the risk of data loss with respect to the intervening backup comprises using metadata associated with the full backup to determine that the full backup was performed by the backup agent, and the metadata is obtained by calling a backup application programming interface (API) of a server that manages backup data.

14. The method of claim 1, wherein the determining whether the differential backup creates the risk of data loss with respect to the intervening backup comprises determining that the full backup remains available on the backup media.

15. The method of claim 1, wherein one or more of the determining that the full backup is available and the determining that the intervening backup was performed subsequent to the full backup is based at least in part on querying a database server using a backup API of the database server.

16. A system to back up data, comprising:
a memory; and
a processor coupled to the memory and configured to execute computer instructions stored in the memory to:
receive an indication to perform a differential backup of a database;
determine whether a full backup to be referenced by the differential backup is available on backup media;
in response to determining that the full backup is available, determine whether an intervening backup was performed subsequent to the full backup;
in response to determining that an intervening backup was performed, determine, by a backup agent executed by the processor, whether performing the differential backup creates a risk of data loss in the event a recovery operation based on the differential backup were performed, wherein:
the determining whether the performing the differential backup creates the risk of loss is based at least in part on a determination of a type of backup corresponding to the intervening backup, wherein the determining whether the performing the differential backup creates the risk of loss is further based at least in part on a determination that backup data comprised in the full backup remains available; and
in response to determining that the performing the differential backup would not create the risk of data loss, perform the differential backup, without promoting to full backup, wherein to perform the differential backup comprises storing corresponding information to a data storage.

17. The system of claim 16, wherein the processor is further configured to promote a backup to be performed from the differential backup to full backup based at least in part on a determination that performing the differential backup creates a risk of data loss with respect to the intervening backup.

18. The system of claim 16, wherein the processor is further configured to verify that a last full backup was performed by a same vendor as the differential backup.

19. The system of claim 16, wherein determining whether the full backup to be referenced by the differential backup is available on backup media includes querying a backup API of the database server to determine metadata associated with a last full backup.

20. The system of claim 19, wherein the processor is further configured to perform a backup media query to determine a last full backup according to backup metadata maintained by a backup server.

21. The system of claim 20, wherein determining whether the full backup to be referenced by the differential backup is available on backup media includes comparing a backup start time and a backup end time as stored by the database server with a corresponding backup start time and backup end time as indicated by the backup server.

22. The system of claim 16, wherein ignoring the intervening backup in response to the determination that the intervening backup is of a type that is unrelated to the risk of data loss includes ignoring a transaction log backup.

23. A computer program product to back up data, the computer program product being embodied in a non-transitory computer readable storage medium and comprising computer instructions for:
receiving, by one or more processors, an indication to perform a differential backup of a database;
determining, by one or more processors, whether a full backup to be referenced by the differential backup is available on backup media;
in response to determining that the full backup is available, determining, by one or more processors, whether an intervening backup was performed subsequent to the full backup;
in response to determining that an intervening backup was performed, determining, by a backup agent executed by one or more processors, whether performing the differential backup creates a risk of data loss with respect to the intervening backup in the event a recovery operation based on the differential backup were performed, wherein:
the determining whether the performing the differential backup creates the risk of loss is based at least in part on a determination of a type of backup corresponding to the intervening backup, wherein the determining whether the performing the differential backup creates the risk of loss is further based at least in part on a determination that backup data comprised in the full backup remains available; and
in response to determining that the performing the differential backup would not create the risk of data loss, performing, by one or more processors, the differential backup, without promoting to full backup, wherein performing the differential backup comprises storing corresponding information to a data storage.

24. The computer program product of claim 23, further comprising computer instructions for promoting a backup to be performed from the differential backup to full backup based at least in part on a determination that performing the differential backup creates a risk of data loss with respect to the intervening backup.

25. The computer program product of claim 23, further comprising computer instructions for verifying that a last full backup was performed by a same vendor as the differential backup.

26. The computer program product of claim 23, wherein determining whether the full backup to be referenced by the differential backup is available on backup media includes querying a backup API of the database server to determine metadata associated with a last full backup.

27. The computer program product of claim 26, further comprising computer instructions for performing a backup media query to determine a last full backup according to backup metadata maintained by a backup server.

28. The computer program product of claim 27, wherein determining whether the full backup to be referenced by the differential backup is available on backup media includes comparing a backup start time and a backup end time as stored by the database server with a corresponding backup start time and backup end time as indicated by the backup server.

\* \* \* \* \*